United States Patent

Kennedy et al.

[11] Patent Number: 5,324,403
[45] Date of Patent: Jun. 28, 1994

[54] PROCESS FOR SALT EXTRACTION FROM HYDROGEN-SULPHIDE SCRUBBER SOLUTION USING ELECTRODIALYSIS

[75] Inventors: Mark W. Kennedy; Abul K. M. Jamaluddin, both of Pointe-Claire; Varujan Baltazar, Montreal; Taras W. Nazarko, Calgary, all of Canada

[73] Assignee: Noranda Inc., Toronto, Canada

[21] Appl. No.: 57,641

[22] Filed: May 5, 1993

[30] Foreign Application Priority Data

May 22, 1992 [CA] Canada .................................. 2069221

[51] Int. Cl.$^5$ ................................................ B01D 61/44
[52] U.S. Cl. .................................... 204/182.4; 204/151; 204/301
[58] Field of Search .................... 204/182.4, 151, 301

[56] References Cited

U.S. PATENT DOCUMENTS

| | | | |
|---|---|---|---|
| 3,897,219 | 7/1975 | Sibeud et al. | 23/288 |
| 4,009,251 | 2/1977 | Meuly et al. | 423/573 |
| 4,011,304 | 3/1977 | Mancini et al. | 423/573 |
| 4,014,983 | 3/1977 | Hardison | 423/575 |
| 4,036,942 | 7/1977 | Sibeud et al. | 423/573 |
| 4,076,621 | 2/1978 | Hardison | 210/60 |
| 4,189,462 | 2/1980 | Thompson | 423/573 |
| 4,218,342 | 8/1980 | Thompson | 252/431 |
| 4,227,981 | 10/1980 | William et al. | 204/182.6 |
| 4,238,462 | 12/1980 | Hardison | 423/224 |
| 4,256,559 | 3/1981 | Ono et al. | 204/180 |
| 4,374,104 | 2/1983 | Primack | 423/226 |
| 4,455,287 | 6/1984 | Primack et al. | 423/573 |
| 4,482,524 | 11/1984 | Hardison | 422/170 |
| 4,526,773 | 7/1985 | Weber | 423/573 |
| 4,622,212 | 11/1986 | McManus et al. | 423/226 |
| 4,820,391 | 4/1989 | Walker | 204/182.4 |
| 4,859,437 | 8/1989 | Grinstead | 423/226 |

FOREIGN PATENT DOCUMENTS 0015737 9/1980 European Pat. Off. .
0286143 10/1988 European Pat. Off. ......... 204/182.6

Primary Examiner—John Niebling
Assistant Examiner—Arun S. Phasge
Attorney, Agent, or Firm—Keck, Mahin & Cate

[57] ABSTRACT

This invention relates a method for the selective removal of alkali metal salts of sulphate ($SO_4^{2-}$), and thiosulphate ($S_2O_3^{2-}$) from hydrogen sulphide ($H_2S$) scrubber solutions of the liquid redox type using an electrodialysis system. In the process of this invention the $H_2S$ scrubber solution is directed to the diluting compartments within an electrodialysis stack, while a collecting solution with a minimal initial salt content is directed to the concentrating compartments. With the application of a direct current a portion of the alkali metal salts of sulphate and thiosulphate present in the scrubber solution are transported through ion selective membranes into the collecting solution. Essentially all of the metal organic chelate reagents and carbonate ions initially present in the scrubber solution are retained in the desalted solution and can be recycled to the $H_2S$ scrubbing process. Organic fouling of the anionic membranes is avoided by maintaining the organic weight fraction of the total dissolved solids in the diluting solution less than 0.15 and preferably less than 0.05. High current efficiency is obtained at salt concentrations above 5 normal in the diluting solution by maintaining the salt concentration of the collecting solution below that in the diluting solution.

18 Claims, 3 Drawing Sheets

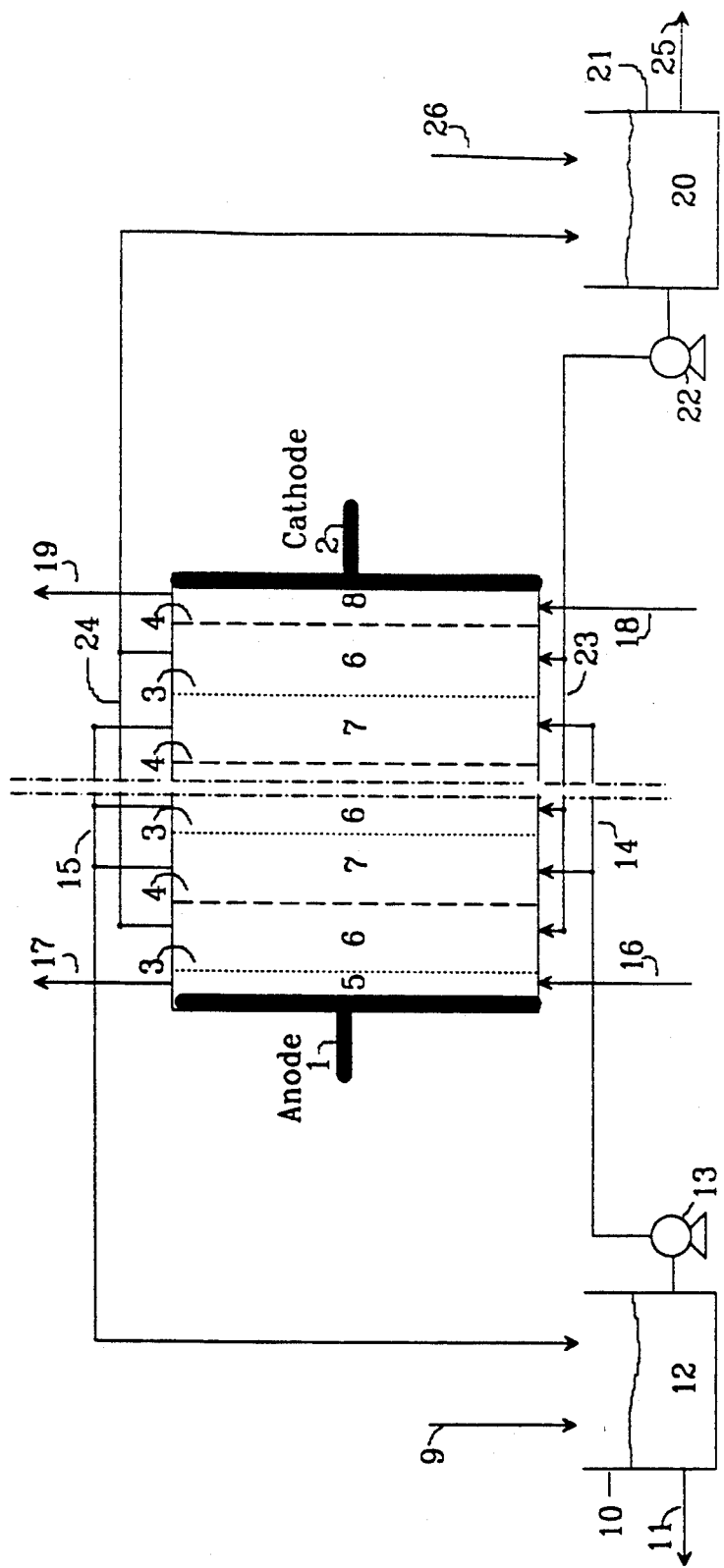
Figure: 1

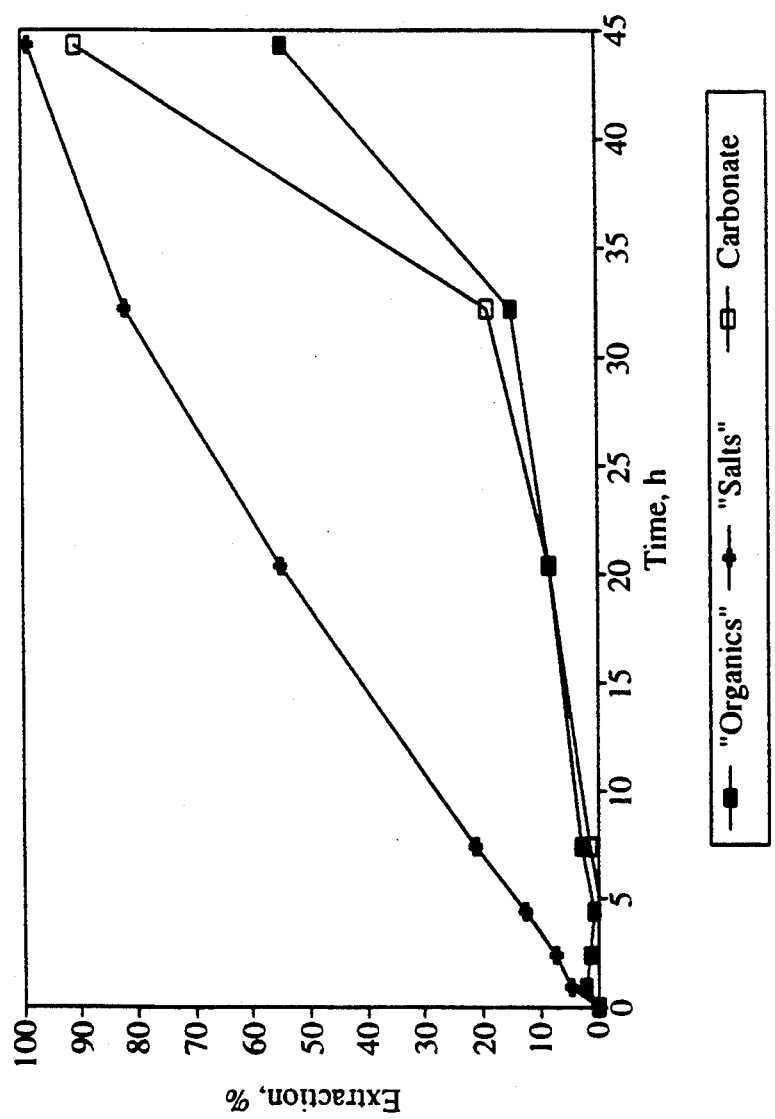
Figure: 2

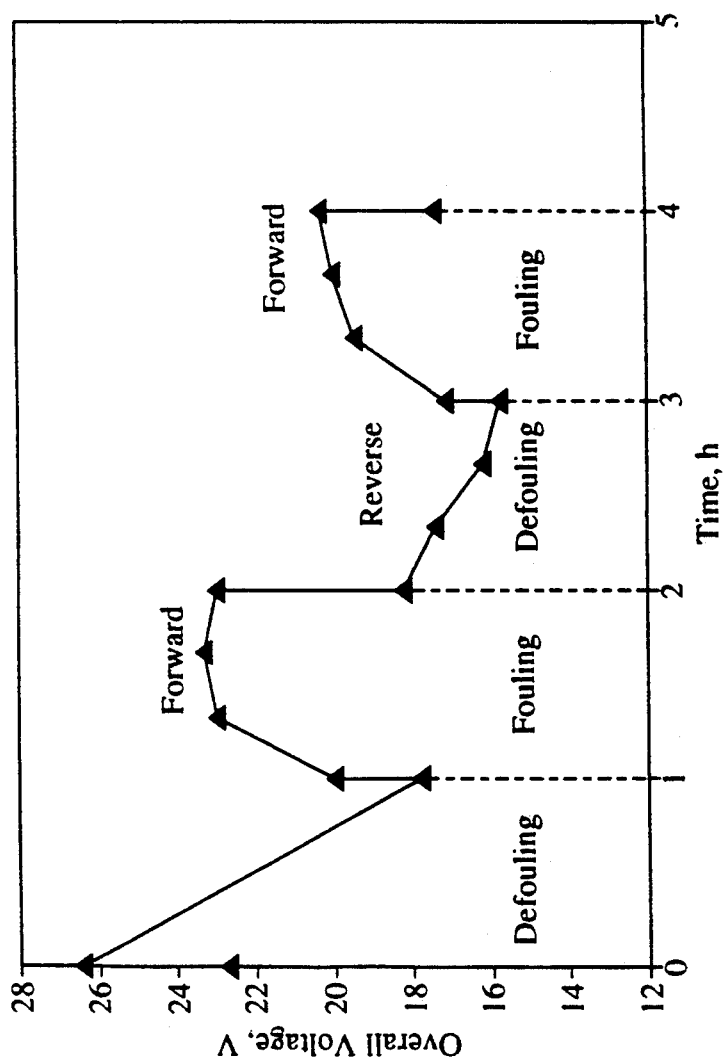
Figure: 3

PROCESS FOR SALT EXTRACTION FROM HYDROGEN-SULPHIDE SCRUBBER SOLUTION USING ELECTRODIALYSIS

This invention relates to a process for salt extraction from hydrogen-sulphide scrubber solution of the liquid reduction-oxidation or redox type using electrodialysis.

BACKGROUND OF THE INVENTION

The liquid reduction-oxidation or redox process is used to scrub hydrogen sulphide ($H_2S$) containing gas streams. In this process the gas containing $H_2S$ is contacted with an alkaline liquid phase (usually at pH 7.0 to 11.0) containing a dissolved metal organic chelate reagent. While any polyvalent transition metal can be employed in this process, iron is most commonly used. The $H_2S$ from the gas stream is absorbed into the alkaline solution forming sulphide ions:

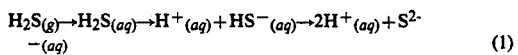
(1)

The sulphide ions react with the polyvalent metal, oxidizing the sulphide to elemental sulphur and reducing the oxidation state of the metal:

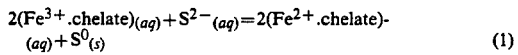
(1)

The metal is then oxidized with dissolved oxygen in the same or a separate vessel:

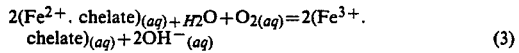
(3)

The overall sulphur producing reaction is:

(4)

Side reactions oxidize some dissolved sulphide ions to acidic sulphur compounds, primarily sulphate ($SO_4^{2-}$) and thiosulphate ($S_2O_3^{2-}$). Sulphite ($SO_3^{2-}$) and dithionate ($S_2O_6^{2-}$) are also formed, but are normally present in insignificant quantities. Walter, C. M., indicated in U.S. Pat. No. 4,009,251 that above pH 7.0 from 2 to 9% of the $H_2S$ fed to a liquid redox scrubber was converted into acidic sulphur compounds. These sulphur compounds tend to lower the pH of the scrubber solution reducing its scrubbing effectiveness. It is normal practice in these processes to maintain the pH of the scrubber solution above 7.0 by the continuous or periodic addition of alkaline chemicals such as the ammonium or alkali metal salts of carbonate ($CO_3^{2-}$), bicarbonate ($HCO_3^-$), or hydroxide ($OH^-$).

The neutralization of the acidic sulphur compounds results in a steady build up of the corresponding ammonium or alkali metal salts. The build up of salts is described by the overall chemical equations given below (for the two most common species formed):

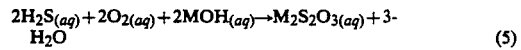
(5)

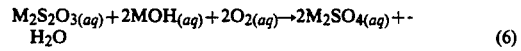
(6)

The presence of excess dissolved salt in the scrubber solution can contaminate the elemental sulphur produced. In scrubbers where the sulphur is removed by settling, high concentrations of dissolved salts can lead to poor sulphur settling because of high solution specific gravity and/or viscosity. If no action is taken the concentration of these salts will increase until the solution becomes saturated. The salts will then precipitate out of solution potentially plugging the piping of the unit.

Several different approaches have been taken to solve the problem of salt build up in the liquid redox processes. Thompson, R. B. in U.S. Pat. No. 4,218,342 recommended withdrawing and disposing a portion of the scrubber solution, and replacing this "blowdown" with fresh, salt-free solution to undersaturate the system. When a blowdown is taken it eliminates all components of the solution, including those which are beneficial or necessary for the operation of the scrubber. Various organic chemicals (such as EDTA, NTA, IDA, sorbitol etc.) are added to the solution to complex the polyvalent metal reagent and increase its solubility at the pH of the system. Additional chemicals are added to the scrubber solution to promote sulphur settling (flocculants, surfactants, antifoam agents), to destroy bacteria (biocides), and to control pH (KOH, $KHCO_3$, $K_2CO_3$, NaOH, $NaHCO_3$, $Na_2CO_3$, etc.). In removing and replacing scrubber solution, all these beneficial chemicals are sacrificed to bleed the offending salts.

The preferred approach would be to withdraw only salts and recycle all of the active chemicals in the solution back to the scrubber. In U.S. Pat. No. 4,859,437 Grinstead, R. R., suggests that a polymeric chelating agent with molecular weight between 500 and 1,000,000 be used to complex the reactive metal (e.g. iron). Grinstead claims that it is then possible to remove water, and all dissolved species having a molecular weight less than 500 using ultrafiltration or diffusion dialysis. Any beneficial chemicals dissolved in the scrubber solution with molecular weight less than 500 (such as those which control pH) will be removed with the salts and degraded organics. Obviously this process restricts the practitioner to using only polymeric chelating agents with suitably high molecular weights.

It is the object of the present invention to provide a process utilizing an electrodialysis system which will:
i) selectively remove alkali metal salts of thiosulphate ($S_2O_3^{2-}$) and sulphate ($SO_4^{2-}$) from hydrogen sulphide ($H_2S$) scrubber solution of the liquid redox type;
ii) retain in the scrubber solution for subsequent recycle:
  a) the polyvalent metal reagent (e.g., iron),
  b) the organic chelating agent, without placing any restriction on the nature (i.e. molecular weight) of the chelating agent to be used in the $H_2S$ scrubber,
  c) and pH adjusting chemicals.

The use of electrodialysis to remove inorganic ions from solutions containing chelated polyvalent transition metals has been reported. Walker, R. J., reported in U.S. Pat. No. 4,820,391 the use of electrodialysis to regenerate $SO_2$-$NO_x$ scrubber solution containing $Fe^{2+}$. EDTA (ferrous-ethylene diamine tetra acetic acid complex) by the removal of sulphite ($SO_3^{2-}$), bisulphite ($HSO_3^-$) and dithionate ($S_2O_6^{2-}$) ions. Ono and Watanabe described a process to remove silver ($Ag^+$) and silver.thiosulphate complex ions from a solution containing both $Fe^{2+}$.EDTA and $Fe^{3+}$.EDTA in U.S. Pat. No. 4,256,559. In European Patent No. 0015737 A1, Grenda, D. W., revealed an electromembrane process to regenerate electroless copper plating baths by the removal of formate ($HCO_2^-$) and sulphate ($SO_4^{2-}$) ions through an anion selective membrane, from a solution containing $Cu^{2+}$ chelated by a variety of different organic chemicals. However, the use of electrodialysis to remove alkali metal salts of sulphate ($SO_4^{2-}$), and thiosulphate ($S_2O_3^{2-}$) from hydrogen sulphide ($H_2S$) scrubber solutions of the liquid redox type has never been reported.

Natural gas containing significant quantities of $H_2S$ ("sour gas") must be treated to prevent corrosion of pipelines during transport. This type of gas is often treated in a two step process. In the first step, $H_2S$ and other acid gases such as $SO_2$, $CO_2$ and mercaptans are removed from the natural gas in an absorber containing an amine solution. This solution is thermally regenerated forming a concentrated gaseous product referred to as "acid gas". This acid gas is then treated in a Claus-type process for the removal of $H_2S$ and $SO_2$, a liquid redox scrubber for the removal of $H_2S$, or is incinerated. The amine solution used to separate the acid gas from the natural gas, can become contaminated with a variety of salts. In European Patent No. 0 286 143 A1 Gregory, R., reported the use of electrodialysis for the removal of inorganic salt species from alkanolamine absorber solution.

SUMMARY OF THE INVENTION

This invention relates a method for the selective removal of alkali metal sulphate ($SO_4^{2-}$), and thiosulphate ($S_2O_3^{2-}$) from hydrogen sulphide ($H_2S$) scrubber solutions of the liquid redox type using an electrodialysis process. The process uses an electrodialysis stack which is characterized by an anode, a cathode and a plurality of alternating cation and anion selective membranes placed between the anode and cathode to define an anode compartment, a multiplicity of alternating enionization and deionization compartments and a cathode compartment. In this process the $H_2S$ scrubber solution is passed through the deionization or diluting compartments of the electrodialysis stack. A collecting solution is circulated through the enionization or concentrating compartments of the electrodialysis stack. When direct current flows through the stack, a portion of the alkali metal sulphate and thiosulphate contained in the scrubber solution are transferred across the above ion selective membranes into the collecting solution. The diluting solution which retains most of the organic chemicals and carbonate ions is recycled to the scrubber process.

Selectivity for alkali metal ion removal can be enhanced by using monovalent cation selective membranes. The use of anion selective membranes with a medium level of crosslinking maximizes sulphate and thiosulphate are removal, with minimum power consumption and organic loss. The use of anionic membranes with too high a level of crosslinking will increase power consumption and organic fouling, while too low a degree of crosslinking will lead to excessive organic loss. The undesired salts are removed with high efficiency and minimum loss of metal organic chelate reagent and carbonate, by maintaining the sulphate and thiosulphate concentration lower in the collecting solution than in the diluting solution and by maintaining the T.D.S. fraction of organics in the diluting solution less than 0.15 and preferably less than 0.05, where the T.D.S. fraction is defined as the fraction of the total solids dissolved in the solution on a weight basis and is hereafter referred to simply as fraction. In one embodiment of this invention, the fraction of organics is maintained sufficiently low in the diluting solution by circulating the diluting solution between the scrubber and the diluting compartments of the electrodialysis stack at a velocity such that only a small portion of the dissolved sulphate and thiosulphate are removed in each pass through the stack. In this manner the concentration of the salts in the diluting compartments is maintained only incrementally lower than that of the solution in the scrubber. In another embodiment, solution is removed from the scrubber process and added to a tank from where it is recirculated between the diluting compartments of the electrodialysis stack and the tank. A sufficiently low organic fraction is maintained by removing less than about half the thiosulphate contained in the solution. Upon achieving sufficient thiosulphate removal the solution is returned to the scrubbing process by completely or partially draining the recirculation tank. The depleted solution is replaced by an equal volume of thiosulphate-rich scrubber solution and the cycle is repeated.

The salt concentration in the collecting solution is maintained below that in the diluting solution by the addition of dilution water, and it is particularly beneficial to add the dilution water periodically rather than continuously. In the preferred embodiment a recirculation tank is used for the collecting solution. Part of the solution in the recirculation tank is periodically withdrawn and replaced with water. The amount withdrawn is determined by the requirement to maintain the conductivity in the collecting solution after dilution with water at 1 to 30 ms/cm. An alternate approach would be to periodically drain the concentrate recirculation tank and refill the tank with water plus an amount of soluble salt (either as a solid or in solution) sufficient to give an initial conductivity of 1 to 30 ms/cm, where the salt could be any alkali metal carbonate, bicarbonate, thiosulphate, sulphate or hydroxide.

The volume of the withdrawn collecting solution is minimized by draining the recirculation tank only when the concentration of salts in the collecting solution reaches a predetermined limit.

Organic fouling of the anionic membranes is avoided when a sufficiently low organic fraction is maintained in the diluting solution. In the event that fouling is experienced the consumption of electrical energy can be minimized by periodically reversing the electrical polarity, while simultaneously switching the diluting and collecting solution flows in the electrodialysis stack, such that the diluting and concentrating compartments are interchanged. Typically the period between reversals is about 5-240 minutes, preferably from 15-60 minutes.

The sole purpose of the electrodes (anode and cathode) in the electrodialysis stack is to provide electrical driving force for the transport of ions. Since electrolytic reactions extraneous to the general process take place at these electrodes, they are contained in special electrode compartments which are often separated from the remainder of the stack by chemically resistant membranes. Many options exist to those skilled in the art for the operation of the two incidental electrode compartments. Special solutions can be used in the two electrode compartments to avoid unwanted reactions. These solutions are called electrode rinse solutions. A solution of any alkali salt of hydroxide, bicarbonate, carbonate or preferably sulphate can be used as electrode rinse solutions. The electrolysis of water takes place at the surface of the two electrodes. Hydrogen is evolved at the cathode and the cathode rinse solution becomes increasingly basic. Oxygen is evolved at the anode and the anode rinse solution becomes increasingly acidic. It is desirable to maintain the pH of the electrode rinse solutions close to that of the diluting and collecting solutions. The rinse solutions can be maintained at a nearly constant pH with minimal additions of acid or base, if the two solutions are continuously mixed or a common rinse solution is used. The hydrogen and oxygen formed at the electrodes must be properly vented to avoid the danger of an explosion.

A detailed description of electrodialysis can be found in the "Kirk-Othmer Encyclopedia of Chemical Technology," 3rd Edition, Volume 8, pg. 726–738, J. Wiley and Sons, 1979.

BRIEF DESCRIPTION OF THE DRAWINGS

The present invention is described below together with the accompanying drawings in which:

FIG. 1 is a detailed drawing of one embodiment of the present invention.

FIG. 2 is a plot of extraction against time; and

FIG. 3 is a plot of overall voltage against time.

DETAILED DESCRIPTION OF THE INVENTION

The electrodialysis stack used in this invention is characterized by an anode (1), a cathode (2), and a multiplicity of alternating cation (3) and anion (4) selective membranes placed therebetween to define an anode compartment (5), a multiplicity of alternating concentrating (6) and diluting (7) compartments and a cathode compartment (8). In the preferred embodiment monovalent cation selective and medium crosslinked anion selective membranes are used. While only six membranes are shown in FIG. 1 an actual system could contain from two to several hundred alternating cation and anion selective membranes.

The feed solution (9) used in this process is any $H_2S$ scrubber solution of the liquid redox type meeting the following characteristics:

1) 5 to 50 weight percent and preferably 10 to 30 weight percent total dissolved inorganic salts, where the salts could include any alkali metal salt of sulphate, thiosulphate, carbonate, bicarbonate and hydroxide, with concentrations in the following ranges:
   0.1 to 10.0 weight percent sulphate,
   1.0 to 30.0 weight percent thiosulphate,
   0.0 to 10.0 total weight percent of other inorganic anions, such as carbonate, bicarbonate and hydroxide,
2) an organic fraction less than 0.15 and preferably less than 0.05, where the organics consist of chelating chemicals, either free or chelated with any polyvalent transition metal such as iron.

In the preferred embodiment the solution (9) is fed to a tank (10) to become the diluting solution (12) of the electrodialysis system. From tank (10) the diluting solution (12) is circulated by a pump (13) through a manifold system (14) to the diluting compartments (7) of the electrodialysis stack and back through a manifold system (15) to tank (10). The diluting solution (12) should be recirculated at a rate sufficient to give a fluid velocity between the membranes in the stack of 1 to 100 cm/s, and preferably between 5 and 10 cm/s. Under the influence of a direct electrical current of 10–1000 $A/m^2$ and preferably from 200–500 $A/m^2$, imposed between the anode (1) and cathode (2) part of the alkali metal salts of sulphate and thiosulphate present in the diluting solution (12) is transported into the concentrating compartments (6) where they enter a collecting solution (20). The diluting solution (12) is returned to the scrubber as bled stream (11) when the concentration of thiosulphate ions in the diluting solution (12) has been sufficiently reduced.

In a second preferred embodiment, recirculation tank (10) is omitted and the $H_2S$ scrubber solution is recirculated directly between the scrubber system and the electrodialysis system via pipe and manifold systems (14) and (15).

Collecting solution (20) is recirculated through the concentrating compartments (6) of the electrodialysis stack and a tank (21) by a pump (22) through manifolds (23) and (24) at such a rate as to balance the pressures between the concentrating (6) and diluting (7) compartments. In one preferred method of the second embodiment the thiosulphate concentration in the collecting solution (20) is maintained below or equal to the concentration in the diluting solution (12) by periodically removing solution from the recirculation tank (21) and replacing the removed solution (25) with water (26). Enough collecting solution (20) is left in tank (21) to provide the required initial conductivity, which is from 1 to 100 mS/cm and preferably from 10 to 30 mS/cm.

In a second preferred method of the second embodiment the thiosulphate concentration of the collecting solution is maintained lower than that of the diluting solution (6) by periodically emptying tank (21). The collecting solution (22) can then be replaced with water plus an amount of soluble salt (either as a solid or in solution) sufficient to give the required initial conductivity, where the salt could be any alkali metal carbonate, bicarbonate, thiosulphate, sulphate or hydroxide. In another preferred embodiment sufficient water (26) is continuously added to the recirculation tank (21) while simultaneously removing a volume of collecting solution (20) to maintain the thiosulphate concentration lower than that of the diluting solution (12).

In the preferred embodiment the pH of the collecting solution (20) is maintained in the range from 7 to 13 and preferably equal to that of the diluting solution (12). The operation of the incidental electrode compartments (5) and (8) and electrode rinse solutions (16) and (18) are left to the discretion of those skilled in the art.

The following examples should help to illustrate the use of the present invention and should in no way restrict its applicability.

EXAMPLE 1

In this example actual $H_2S$ scrubber solution removed from a Lo-Cat ® commercial $H_2S$ scrubber was used for feed material. Since the available Lo-Cat solution had not yet accumulated a high level of salts, reagent-grade sodium carbonate, and potassium thiosulphate were used to increase the total-dissolved solids (T.D.S.) of the solution from 9.17% to 29.5%. The organics present in the modified solution had an initial organic fraction less than 0.03.

The apparatus used in this example consisted of a Tokuyama Soda model TS-2-10 electrodialyser equipped with a platinized titanium anode, and a 316-stainless steel cathode, both 11.0 cm by 17.5 cm. Ten pairs of Tokuyama CMS monovalent cation selective membranes and Tokuyama AM#2 medium cross-linked anion selective membranes were used in the stack. The two electrode compartments (anode and cathode) were isolated by special cation selective membranes (Dupont Nafion 324, and Tokuyama Soda CM#2). Each membrane was 18 cm by 28.4 cm with an effective membrane area of 0.02 m$^2$ for a total stack area of 0.2 m$^2$. The space between individual membranes in the stack was 0.75 mm.

The Lo-Cat solution was pumped between the diluting compartments of the electrodialysis stack and a recirculation tank at a rate of 1.0 U.S. gallon per minute. The flows of the collecting solution and the common electrode rinse solutions were set so as to balance the pressures across the stack and were approximately 2.0 U.S. gallons per minute. The collecting solution and electrode rinse solutions were made by dissolving potassium carbonate into deionized water to obtain initial conductivities of about 20 mS/cm.

A direct current electrical potential of 36 to 17 volts was applied to the electrodes to obtain a constant current of 8 amps, and a current density of 400 A/m$^2$. Power was applied over a total period of 44.3 hours.

The results of this experiment at time zero and for approximately 50 mass percent salt extraction are in Table I. The mass percent extraction of "salts," "organics" and carbonate have been plotted as a function of time in FIG. 2. "Salts" are defined as the total mass of: Na$^+$, K$^+$, SO$_4^{2-}$, and S$_2$O$_3^{2-}$, while "organics" are defined as the total mass of Na$_3$NTA, Na$_2$IDA, and sorbital present in the diluting solution. In FIG. 2 it is shown that at 50 percent salt extraction less than 8 percent of the organics have been co-extracted. Surprisingly it was found that less than 10 percent of the carbonate ions were extracted below 50 percent salt extraction. No satisfactory explanation has been found for this behaviour. Both organic and carbonate extractions were found to dramatically increase at more than 50 percent salt extraction. As a result the present invention provides a highly selective means of removing the alkali metal salts of sulphate and thiosulphate from the solution when salt extractions are limited to about 50 percent.

voltage required to maintain a constant current of 200 A/m$^2$ has been plotted as a function of time, showing reversal occurring every 60 minutes. It is clear from this figure that current reversal with solution reversal could control the fouling. Over 35 mass percent of the salt was extracted from the solution with a co-extraction of organics less than 7 percent and carbonate less than 10 percent.

We claim:

1. A process for the selective removal of alkali metal sulphate and thiosulphate from hydrogen sulphide scrubber solutions comprising carbonate ions and polyvalent metals chelated with organic chelating agent using an electrodialysis stack comprising an anode, a cathode, and a plurality of alternating cation and anion selective membranes placed therebetween to define an anode compartment, a multiplicity of alternating enionization and deionization compartments and a cathode compartment, said process comprising:

a) passing said scrubber solution as a diluting solution through the deionization compartments of said electrodialysis stack;
   b) circulating a collecting solution through the enionization compartments of the electrodialysis stack;
   c) flowing a direct current between the electrodes to transfer a portion of the alkali metal sulphate and thiosulphate present in the scrubber solution across said ion selective membranes into the collecting solution; and
   d) recycling the diluting solution which retains the majority of the organic chelating agents and carbonate ions to the scrubber process.

2. A process as defined in claim 1 wherein the initial conductivity of the collecting solution is between 1 and 30 mS/cm.

3. A process as defined in claim 2, further comprising the step of maintaining the sulphate and thiosulphate concentration lower in the collecting solution than in the diluting solution.

4. A process as defined in claim 3, wherein the sulphate and thiosulphate concentration is maintained lower in the collecting solution than in the diluting

TABLE I

| Current: 8 A<br>Current Density: 400 A/m$^2$ | Dilute at 0 h | Dilute at 20.5 h | Concentrate at 0 h | Concentrate at 20.5 h |
|---|---|---|---|---|
| Temperature, °C. | 25.1 | 35.0 | 25.7 | 36.1 |
| Volume, L | 26.9 | 20.6 | 25.4 | 28.1 |
| Conductivity, mS/cm | 213.0 | 161.1 | 22.0 | 160.1 |
| pH | 10.07 | 10.33 | 11.31 | 9.49 |
| K$^+$, g/L | 76.8 | 47.3 | 8.30 | 47.4 |
| Na$^+$, g/L | 79.1 | 57.0 | 0.37 | 21.7 |
| SO$_4^{2-}$, g/L | 24.6 | 22.9 | 0.1 | 5.8 |
| S$_2$O$_3^{2-}$, g/L | 175.0 | 78.2 | 0.0 | 90.2 |
| CO$_3^{2-}$, g/L | 38.9 | 45.4 | 6.5 | 8.4 |
| Na$_3$NTA, g/L | 15.0 | 17.8 | 0.00 | 0.55 |
| Na$_2$IDA, g/L | 4.24 | 4.73 | 0.00 | 0.38 |
| HOCH$_2$(CHOH)$_4$CH$_2$OH, g/L | 2.16 | 2.47 | 0.00 | 0.14 |
| Chelated Fe$^{a+}$, mg/L | 490 | 600 | 0.5 | 12.6 |

EXAMPLE 2

The same apparatus from example 1 was used in this example. In example 2 the unmodified Lo-Cat$^R$ solution with total dissolved solids of 9.3% was used as feed material. The initial organic fraction was 0.19. Fouling of the anionic membranes was experienced, but current reversal with simultaneous reversal of the flow of the diluting and collecting solutions was used to control the power requirement for the system. In FIG. 3 the overall solution by controlling the salt concentration in the collecting solution by dilution with water.

5. A process as defined in claim 4, wherein a recirculation tank is used for the collecting solution and wherein a portion of the solution in the recirculation tank is periodically withdrawn and replaced with water, the amount of solution withdrawn being determined by the requirement to maintain a minimum conductivity in the collecting solution after dilution with water.

6. A process as defined in claim 4, wherein a recirculation tank is used for the collecting solution and wherein the recirculation tank is periodically drained and refilled with water plus an amount of soluble salt sufficient to give the required initial conductivity.

7. A process as defined in claim 6, wherein the soluble salt is added in the collecting solution to maintain the conductivity, the soluble salt being selected from the group consisting of alkali metal carbonate, bicarbonate, thiosulphate, and sulphate.

8. A process as defined in claim 7, wherein the recirculation tank is drained when the concentration of thiosulphate in the collecting solution is equal to that in the diluting solution.

9. A process as defined in claim 6, wherein the recirculation tank is drained when the concentration of thiosulphate in the collecting solution is equal to that in the diluting solution.

10. A process as defined in claim 1, further comprising the step of maintaining the fraction of organic chelating agent in the diluting solution less than 0.15.

11. A process as defined in claim 10, wherein the fraction of the organic chelating agent is maintained in the diluting solution by circulating the diluting solution at a velocity such that only a small portion of the dissolved sulphate and thiosulphate are removed in each pass through the stack so that the concentration of the sulphate and thiosulphate in the diluting solution is maintained almost equal to that of the solution in the scrubber.

12. A process as defined in claim 10, wherein the diluting solution is removed from the scrubbing process and placed in a tank where it is recirculated between the diluting compartments of the stack and the tank.

13. A process as defined in claim 12, wherein a sufficiently low organic fraction is maintained by removing less than about half the thiosulphate contained in the solution.

14. A process as defined in claim 13, wherein upon achieving sufficient thiosulphate removal the solution is returned to the scrubbing process by draining the recirculation tank and replacing the depleted solution by an equal volume of thiosulphate rich scrubber solution.

15. A process as defined in claim 10, wherein fouling of the anionic membranes is controlled when the organic fraction is higher than 0.15 by periodically reversing the polarity of the electrodes while simultaneously switching the flow of the diluting and collecting solutions in the electrodialysis stack.

16. A process as defined in claim 15, wherein the solution flow of the diluting and collecting solutions are switched simultaneously with the polarity reversal at a predetermined interval between 5 and 240 minutes.

17. A process as defined in claim 1 wherein the organic chelating agent is selected from the group consisting of ethylenediamine tetraacetic acid (EDTA), nitrilotriacetic acid (NTA), iminodiacetic acid (IDA), sorbitol or a sorbitol derivative, and mixtures thereof.

18. A process as defined in claim 1 wherein the polyvalent metal is iron.

* * * * *